United States Patent Office 3,300,284
Patented Jan. 24, 1967

3,300,284
PREPARATION OF ACTINIDE METAL
CARBIDE MICROSPHERES
Roger L. Pilloton and Robert L. Hamner, Oak Ridge,
Tenn., assignors to the United States of America as
represented by the United States Atomic Energy Commission
No Drawing. Filed Aug. 19, 1965, Ser. No. 481,148
5 Claims. (Cl. 23—345)

This invention relates generally to processes for preparing spherical nuclear fuels and more particularly to a method for converting metal oxide fuel particles to carbide fuel particles.

One area of fuel materials technology which has been extensively investigated in the last few years is that of particulate fissionable material. This type fuel material generally comprises a core of fissionable material with a surrounding impervious coating which, among other functions, serves as a barrier to fission product release to the environments. It is well known in the art that such spherical fuel particles are highly desirable as reactor fuels. For example, the coated fuel particles might serve as the fuel element, such as in a suspension or fluidized system, or they could be fabricated into conventionally shaped elements such as dispersion-type reactor fuel elements. The advantages achieved with such coated fuels are numerous and consist, in part, with a large number of core, matrix, and coolant combinations which are possible for use over an extended temperature range. Of the various fuel particle compositions studied, the metal carbide and oxides have been extensively investigated as reactor fuels; and while the oxide particles have good nuclear properties, the metal carbides are generally preferred over the oxides for high temperature operation due to their higher thermal conductivity and higher density.

The metal carbide particles have generally been prepared heretofore by reacting the metal, hydride, or oxide of the metal with carbon at an elevated temperature with the latter, i.e., a direct conversion of the metal oxide to carbide particles, being of particular interest. In such a process for converting the oxide fuel particles to correspondingly sized carbide particles, it is highly desirable that the conversion not only be essentially complete but that the conversion should be effected so as to render the resulting carbide particles in readily useable form, i.e., discrete and dense particles. Moreover, the particles should retain their sphericity during conversion and be essentially free of contaminants.

The prior art method hereinbefore mentioned experienced a common problem in producing acceptable carbide microspheres—that of experiencing agglomeration and/or sticking of the particles together or to the container surface, while carrying out the conversion operation. Heretofore, the oxide starting material was mixed with carbon powder, granulated, heated in a stationary vessel under vacuum to 1900°–2100° C. to form a low-density, porous carbide, and finally heated to approximately 2500° C. to densify and spheroidize the carbide particles. Due to the wide range of particles obtained by spheroidizing, a sizing operation was required to provide particles of a selected particle size range. This method is expensive because the densification and spheroidization steps require very high temperatures, and the yield from the same input is less due to the sizing operations. Moreover, the control of the sphericity of the resulting particles is very delicate because of the reaction of carbon with molten carbides, and the degree of sphericity of the final product is frequently low. In addition, these stationary systems have not been amenable to continuous operations, nor have they been found to be capable of meeting the strict requirements of remote refabrication operations.

It is, therefore, desirable and an object of this invention to provide a method of preparing metal carbide fuel particles from correspondingly sized metal oxide fuel particles wherein essentially complete conversion is afforded without any adherence or agglomeration of the particles. It is also an object of this invention to provide a method for preparing metal carbide fuels from oxide microspheres which is amenable to remote handling techniques. A further object is to provide a method for converting sol-gel prepared thorium oxide and/or uranium oxide particles to corresponding carbide fuel particles at a relatively low temperature wherein such conversion is effected without melting the oxide particles.

With these and other objects in mind, this invention comprises heating without melting actinide oxide fuel microspheres having a density of at least 97% of theoretical in a bed of carbon at a temperature sufficient to convert in situ substantially all of said actinide oxide microspheres to correspondingly sized dense actinide carbide microspheres. Applicants have found that essentially complete conversion of actinide oxide fuels of substantially theoretical density, such as thorium oxide and uranium oxide and mixtures thereof, to the carbide may be achieved without any deleterious particle agglomeration or reaction bonding of the particles to the chamber surface, when carried out in accordance with this process. Although the fuel particles, in such a conversion, undergo a slight change in density (density of $ThO_2$ is 10.00 g./cm.$^3$ compared with 9.62 g./cm.$^3$ for the carbide) the resulting metal carbide particles were found to retain their integrity and to undergo no gross change in dimensions. Moreover, the converted carbide particles were found to remain dense, where dense metal oxide particles were employed. The pesent process may be operated batchwise or continuously and is amenable to remote operations.

In carrying out this process, there are a number of factors which must be controlled carefully in order to successfully achieve the goals of this invention. In the first place, the carbon should be in a finely-divided state. This ensures good contact with the oxide particles as well as alleviates any adhesion of the particles to the carbon, as where massive carbon is employed and which, if used, would be bonded to the carbon after conversion. While any carbon source may be employed, flours of graphite and/or carbon have been found to be most effective and are preferred. The quantity of carbon should be at least stoichiometric; and where, for example, thorium oxide is used, it may be seen from the following equation that approximately 20 weight percent carbon is required:

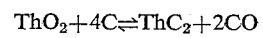
$$ThO_2 + 4C \rightleftharpoons ThC_2 + 2CO$$

An excess of carbon, such as from 2 to 5 times the stoichiometric quantity require has been found to be quite satisfactory, with a weight ratio of about 1:1 carbon to thoria being preferred. This weight ratio not only provides the amount of carbon required for stoichiometry but also provides excess carbon which serves as an insulation medium between the fuel particles; thus, aiding in preventing particle agglomeration which was found to be extensive where no excess of carbon was provided.

A second feature of importance in the achievement of satisfactory metal carbide particles is the rotary chamber design and operation during conversion. While the apparatus employed in carrying out this process may vary widely in design, applicants have found that a rotary drum is especially efficacious. When conversion was carried out in such rotary chamber, complete conversion of the metal oxide to the carbide could be afforded without any agglomeration or adhesion of the particles. It should be noted here that the twin problems of particle agglomeration and reaction bonding of the particles to the chamber walls were found to be quite complex, in that a number of process factors, such as conversion temperature, time and speed of rotation, each had an effect on achieving complete conversion while rendering the converted metal carbide in a useable form, i.e., discrete, unagglomerated and unbonded particles. Where a rotating drum is employed, the drum may comprise, for example, a horizontally-disposed, smooth-walled, cylindrical graphite crucible adapted to rotate about its major axis. For larger capacity runs, a stationary fin or rib structure may be disposed along the inner wall of the crucible for periodic redispersal of the charge and should be so disposed at an angle to the crucible wall so as to not impede particle movement over the fin while causing a complete redispersion of the charge each revolution; for this a stationary fin inclined at a 30° angle to the crucible wall is suitable. With regard to the rotary movement of the particles within the graphite crucible, applicants have found that the crucible should be rotated at a peripheral speed of at least 142 in./min. and preferably 311 in./min. to preclude reaction bonding or adhesion of the particles to the crucible wall. It should be noted here that, for the same conditions of time and temperature, as the speed of rotation is increased, the propensity of adhesion is lessened; however, with an increase in rotation speed the degree of conversion is reduced.

Still another factor is the step of carrying out the conversion at such a temperature which will ensure complete conversion but will not cause agglomeration or adhesion of the particles. It has generally been found that temperatures above 2000° C. are required to effect conversion of thorium oxide to corresponding carbide, with conversion of uranium oxide being converted to the corresponding carbide at somewhat lower temperatures than 2000° C. It should be apparent that, as the temperature at which conversion is accomplished increases, the time required to achieve complete conversion decreases. However, it has been found that at the higher temperatures particle agglomeration becomes more severe and under no circumstances should the melting point of the metal oxide fuel be exceeded during conversion. Generally, it has been found that suitable conversion temperatures, i.e., that temperature at which complete conversion is effected without particle agglomeration or reaction bonding, were slightly lower when carried out in a crucible design employing a fin structure. For example, complete conversion of thorium oxide was obtained in 2 hours at 2200° C., while it required 3 hours at 2150° C. and >5 at 2050° C. At temperatures above 2200° C. particle agglomeration became a more severe problem and temperatures below 2150° C. conversion times became inordinately large. On the other hand conversion of uranium oxide metal fuel particles to corresponding-sized metal carbide particles without agglomeration or reaction bonding was effected within a range of 1800° to 2000° C.

Finally, the conversion is best carried out in an inert environment (inert gas or in vacuo). While the conversion process may be carried out under a vacuum, due to the difficulties inherent in vacuum systems, especially in regards to remote operation, it is preferred that the process be carried out in an inert atmosphere. For this argon has been found to be quite satisfactory. It is similarly preferred that the argon be passed through the rotating drum, and on laboratory scale equipment (2" diameter x 5" long crucible) a flow rate of about 3 ft³/hr. through the conversion furnace has been found suitable.

With respect to the oxide particles as starting materials, it will be apparent that where dense carbide particles are desired, the corresponding initial metal oxide particles should be dense. While the history of the oxide particles does not have any effect on the resulting carbide particles, i.e., any conventional method for preparing metal oxide particles may be employed, a convenient method for preparing dense metal oxide particles is by the sol-gel process (see S.N. 385,813 filed July 28, 1965 in the names of Sam D. Clinton, et al. for "Process and Apparatus for Preparing Oxide Gel Microspheres from Sols").

It should be apparent that this process is equally applicable to preparing porous metal carbide particles; and where porous carbide particles are desired, the metal oxide particles should correspondingly be porous. Of course, the particles in any event should be substantially spherical in shape. While the particle diameter of the oxide particles may vary over a wide range, this process is useful for converting metal oxide particles, such as thorium oxide, having an average diameter of from 100–1000 microns, particularly 300–400 microns, to correspondingly sized metal carbide particles.

Having thus described the present invention in a general fashion, the following examples are provided to illustrate the quantitative aspects and procedures in greater detail. Examples I–V demonstrate the effect the process parameters of time and temperature have upon the conversion of thorium oxide particles to thorium dicarbide particles. Examples VI–IX demonstrate the conversion of uranium oxide to corresponding carbide particles, and Example X demonstrates the conversion of mixtures of uranium oxide—uranium oxide particles to corresponding carbides.

EXAMPLE I

*Apparatus*

A furnace containing a 2½" I.D. x 3" long cylindrical smooth-walled, horizontally-disposed, graphite crucible was used for carrying out a conversion experiment. The graphite crucible had a stationary fin inclined at a 30° angle to the crucible wall and was adapted to rotate around its longitudinal axis. The rotating crucible was housed in a stationary graphite susceptor which was, in turn, surrounded with carbon felt insulation and the whole assembly housed in a fused silica tube. Induction coils were placed around the fused silica tube. Axially disposed graphite inlet tubes which also served as sight tubes for optical pyrometer temperature measurements were connected to the graphite crucible, and a variable speed motor was affixed to the free end of one of the graphite tubes to provide rotation of the graphite crucible within the graphite susceptor. The furnace was connected to a vacuum system for initial purging, and the graphite inlet tube was connected to an argon source.

*Procedure*

The feasibility of converting dense, sol-gel thorium oxide microspheres to similarly sized dense thorium dicarbide particles in a rotary system was established as follows: five grams of 300–400 micron sol-gel prepared thorium oxide microspheres (>97% theoretical density) were placed with five grams of lampblack, which had been pre-conditioned by heating in vacuum at 2200° C. for 2 hours, in the converter furnace described above. The particles were heated for 5 hours at 2050° C. in a flowing argon atmosphere (3 ft.³/hr.) while rotating the crucible at approximately 311 in./min. Temperature determination was made by an optical pyrometer sighting on a graphite sight block disposed within the graphite crucible.

The furnace was then cooled to room temperature, emptied of the particles and the walls examined for reaction bonding of the particles to the walls. The removed particles were next washed with carbon tetrachloride, dried with flowing argon and examined under a microscope for agglomeration. Finally, the particles were examined by X-ray diffraction and metallography. The thorium oxide microspheres were found to be almost completely converted to thorium dicarbide without bonding to the crucible and without agglomeration of particles.

EXAMPLE II

Five grams of 300–400 micron sol-gel thorium oxide microspheres (>97% of theoretical density) were placed with five grams of lampblack in the converter furnace described in Example I. The charge was heated for 2 hours at 2150° C. in a flowing argon atmosphere (3 ft.$^3$/hr.) while rotating the crucible at approximately 311 in./min.

The examining procedure and techniques employed in Example I were used and the particles were found to be incompletely converted to thorium dicarbide without bonding to the crucible and without agglomeration of particles.

EXAMPLE III

Five grams of 300–400 micron sol-gel thorium oxide microspheres (>97% of theoretical density) were placed with five grams of lampblack in the converter furnace described in Example I. The charge was heated for 3 hours at 2150° C. in a flowing argon atmosphere (3 ft.$^3$/hr.) while rotating the crucible at approximately 311 in./min.

The examining procedure and techniques employed in Example I were used and the particles were found to be completely converted to thorium decarbide without bonding to the crucible and without agglomeration of particles.

EXAMPLE IV

Five grams of 300–400 micron sol-gel thorium oxide microspheres (>97% of theoretical density) were placed with five grams of lampblack in the converter furnace described in Example I. The charge was heated for 1 hour at 2200° C. in a flowing argon atmosphere (3 ft.$^3$/hr.) while rotating the crucible at approximately 311 in./min.

The particles were examined as in Example I, and the particles were found to be incompletely converted to thorium dicarbide without bonding to the crucible and without agglomeration of the particles.

EXAMPLE V

Five grams of 300–400 micron sol-gel thorium oxide microspheres (>97% of theoretical density) were placed with five grams of lampblack in the converter furnace described in Example I. The charge was heated for 2 hours at 2200° C. in a flowing argon atmosphere (3 ft.$^3$/hr.) while rotating the crucible at approximately 311 in./min.

The particles were examined as in Example I, and the particles were found to be completely converted to thorium dicarbide without bonding to the crucible and without agglomeration of the particles.

EXAMPLE VI

Five grams of 100–150 micron sol-gel uranium dioxide microspheres (>97% of theoretical density) were placed with five grams of lampblack in the converter furnace described in Example I. The charge was heated for 5 hours at 1700° C. in a flowing argon atmosphere (3 ft.$^3$/hr.) while rotating the crucible at approximately 311 in./min.

The examining procedure and techniques employed in Example I were used except for X-ray diffraction analysis, and the particles were found to be incompletely converted to uranium carbides containing some porous areas according to metallography without bonding to the crucible and without agglomeration of particles.

EXAMPLE VII

Five grams of 100–150 micron sol-gel uranium dioxide microspheres (>97% of theoretical density) were placed with five grams of lampblack in the converter furnace described in Example I. The charge was heated for 3 hours at 1800° C. in a flowing argon atmosphere (3 ft.$^3$/hr.) while rotating the crucible at approximately 311 in./min.

The examining procedure and techniques employed in Example I were used except for X-ray diffraction analysis, and the particles were found to be incompletely converted to uranium carbides containing some porous areas according to metallography without bonding to the crucible and without agglomeration of particles.

EXAMPLE VIII

Five grams of 100–150 micron sol-gel uranium dioxide microspheres (>97% of theoretical density) were placed with five grams of lampblack in the converter furnace described in Example I. The charge was heated for 4 hours at 1900° C. in a flowing argon atmosphere (3 ft.$^3$/hr.) while rotating the crucible at approximately 311 in./min.

The examining procedure and techniques employed in Example I were used except for X-ray diffraction analysis, and the particles were found to be completely converted to uranium carbides containing some porous areas according to metallography without bonding to the crucible and without agglomeration of particles.

EXAMPLE IX

Five grams of 100–150 micron sol-gel uranium dioxide microspheres (>97% of theoretical density) were placed with five grams of lampblack in the converter furnace described in Example I. The charge was heated for 2 hours at 2000° C. in a flowing argon atmosphere (3 ft.$^3$/hr.) while rotating the crucible at approximately 311 in./min.

The examining procedure and techniques employed in Example I were used except for X-ray diffraction analysis, and the particles were found to be completely converted to uranium carbides containing some porous areas according to metallography without bonding to the crucible and without agglomeration of particles.

EXAMPLE X

Five grams of 177–259 micron sol-gel thorium oxide—25% uranium oxide microspheres (>97% of theoretical density) were placed with five grams of lampblack in the converter furnace described in Example I. The charge was heated for 2 hours at 2150° C. in a flowing argon atmosphere (3 ft.$^3$/hr.) while rotating the crucible at approximately 311 in./min.

The examining procedure and techniques employed in Example I were used except for X-ray diffraction analysis, and the particles were found to be completely converted to thorium and uranium carbide containing some porous areas according to metallography without bonding to the crucible and without agglomeration of particles.

What is claimed is:

1. A process for converting dense actinide oxide microspheres having a density of at least 97% of theoretical to correspondingly dense carbide microspheres comprising heating without melting said oxide microspheres in a bed of carbon to a temperature sufficient to convert in situ substantially all of said oxide microspheres to carbide microspheres.

2. A process for preparing dense actinide carbide fuel microspheres comprising contacting actinide oxide fuel microspheres having a density of at least 97% of theoretical with carbon in a rotary chamber at a temperature sufficient to convert in situ without melting substantially all of said oxide to correspondingly sized carbide microspheres while simultaneously rotating said chamber at a peripheral speed of approximately 311 in./min.

3. The process of claim 2 wherein said actinide oxide microspheres are selected from the class consisting of uranium oxide, thorium oxide, and mixtures thereof.

4. The process of claim 2 wherein said actinide oxide fuel microspheres comprise 300–400 micron calcined thorium oxide having a density of at least 97% of theoretical and said heating step is carried out in argon at a temperature between 2050°–2200° C.

5. The process of claim 2 wherein said actinide oxide fuel microspheres comprise calcined uranium oxide microspheres having a density of at least 97% theoretical and said heating step is carried out in argon at a temperature between 1800°–2000° C.

References Cited by the Examiner
UNITED STATES PATENTS

| 2,460,977 | 2/1949 | Davis et al. | 65—21 |
| 3,179,722 | 4/1965 | Shoemaker | 264—0.5 |
| 3,179,723 | 4/1965 | Goeddel | 264—0.5 |

References Cited by the Applicant

"TID-7654, p. 379, Ceramic Matrix Fuels Containing Coated Particles."

CARL D. QUARFORTH, *Primary Examiner.*

L. DEWAYNE RUTLEDGE, *Examiner.*

S. TRAUB, *Assistant Examiner.*